United States Patent [19]

De Doncker

[11] Patent Number: 4,968,925
[45] Date of Patent: Nov. 6, 1990

[54] UNIVERSAL FIELD-ORIENTED CONTROLLER

[75] Inventor: Wivina A. A. De Doncker, Schenectady, N.Y.

[73] Assignee: General Electric Company, Schenectady, N.Y.

[21] Appl. No.: 390,553

[22] Filed: Aug. 7, 1989

[51] Int. Cl.$^5$ .............................................. H02D 5/40
[52] U.S. Cl. .................................... 318/727; 318/800; 318/805; 318/803
[58] Field of Search ................................ 318/727-819

[56] References Cited

U.S. PATENT DOCUMENTS

| | | | |
|---|---|---|---|
| 4,230,979 | 10/1980 | Espelage et al. | 318/803 X |
| 4,281,276 | 7/1981 | Cutler et al. | 318/803 |
| 4,455,522 | 6/1984 | Lipo | 318/809 |
| 4,484,126 | 11/1984 | Fulton et al. | 318/812 X |
| 4,539,514 | 9/1985 | Espelage et al. | 318/778 |
| 4,562,396 | 12/1985 | Espelage et al. | 318/809 |
| 4,593,240 | 6/1986 | Blaschke | 318/800 |
| 4,600,874 | 7/1986 | Tupper et al. | 318/805 X |
| 4,602,198 | 7/1986 | Weiss et al. | 318/805 X |
| 4,602,199 | 7/1986 | Walker | 318/805 X |
| 4,626,761 | 12/1986 | Blaschke | 318/805 X |
| 4,677,360 | 6/1987 | Garces | 318/805 X |
| 4,757,248 | 7/1988 | Fujioka et al. | 318/807 |
| 4,800,327 | 1/1989 | Fujioka et al. | 318/811 X |
| 4,823,066 | 4/1989 | Yoshiki et al. | 318/806 X |
| 4,873,478 | 10/1989 | Weiss | 318/779 |

OTHER PUBLICATIONS

X. Xu, R. W. De Doncker, D. W. Novotny, "Stator Flux Orientation Control of Induction Machines in the Field Weakening Region", Conference Record, IEEE-IAS Annular Meeting, Oct. 1988.
*Field Orientation and High Performance Motion Control*, University of Wisconsin-Madison, 1989, ch. 5, pp. 59–61.
R. W. De Doncker and F. Profumo, "The Universal Field Oriented Controller Applied to Tapped Stator Windings Induction Motors", Conference Record, IEEE Power Electronics Specialist's Conference, 1989, vol. II, pp. 1031–1036.
R. W. De Doncker and D. W. Novotny, "The Universal Field Oriented Controller", Conference Record, IEEE-IAS Annual Meeting, Oct. 1988, pp. 450–456.
R. W. De Doncker, "Field Oriented Controllers with Rotor Deep Bar Compensation Circuits", Conference Record, IEEE-IAS Annual Meeting, Oct. 1987, pp. 142–149.
X. Xu, R. W. De Doncker and D. W. Novotny, "A Stator Flux Oriented Induction Machine Drive", 1988 Power Electronics Specialist's Conference, Apr. 1988, Kyoto, Japan, 870–876.

*Primary Examiner*—William M. Shoop, Jr.
*Assistant Examiner*—Paul Ip
*Attorney, Agent, or Firm*—Jill M. Breedlove; James C. Davis, Jr.; Marvin Snyder

[57] ABSTRACT

A universal field-oriented controller (UFO) for an induction machine drive is capable of decoupling flux and torque in an arbitrary flux reference frame. Transitions between reference frames, including rotor flux, stator flux and air gap flux, are made by changing the effective stator-to-rotor turns ratio. The UFO is capable of operating in a direct field-orientation mode and an indirect field-orientation mode without requiring additional hardware or software.

25 Claims, 13 Drawing Sheets

UNIVERSAL FIELD-ORIENTED CONTROLLER

FIELD OF THE INVENTION

The present invention relates generally to a field-oriented controller for an induction machine. More particularly, the present invention relates to a universal field-oriented controller for an induction machine which is capable of decoupling flux and torque in an arbitrary reference frame.

Background of the Invention

The ongoing development of new and sophisticated machine tools, robots and computer-controlled electromechanical systems has resulted in an ever increasing need for high performance drives. In particular, such drives are needed to provide precise and rapid dynamic control of machine torque output under essentially all operating conditions. Historically, a class of separately excited DC motors using series compensation windings has been primarily employed in high performance drive applications. However, technological advancements in the areas of high frequency switching power components and systems have lead to the development of high performance AC drive systems.

The fundamental goal in a high performance AC drive system is to control flux level in the machine and electromagnetic torque output independently, i.e., to decouple flux and torque In order to achieve this goal, the spatial positions of the field flux vector and a specific stator current vector must be correctly oriented with respect to each other. To this end, amplitude and phase of the stator currents are controlled. This type of control is commonly referred to as field-oriented, angle, or vector control.

The purpose of field-oriented control methods is to control an AC machine like a separately excited DC machine for which the flux and torque components of stator current are decoupled. The basic principle of field-oriented control applies to both synchronous and asynchronous machines. Conventional models are based upon the dq (direct and quadrature) axes wherein the currents $i_{ds}$ and $i_{qs}$ represent the direct (d) axis component and the quadrature (q) axis component of stator current, respectively. Current $i_{ds}$ is analogous to the flux component of stator current in a DC machine, and current $i_{qs}$ is analogous to the torque component. Moreover, field orientation is obtained by using a synchronous reference frame fixed to a flux vector. Classical field-oriented controllers use rotor flux as a reference vector. Other more recent field-oriented controllers use air gap flux or stator flux as reference vectors.

In general, there are two methods of field-oriented control: (1) direct field-orientation (DFO); and (2) indirect field-orientation (IFO). According to DFO, the reference vector is sensed by measuring actual machine signals. According to IFO, the reference vector is calculated using a machine model. For example, in the case of an induction machine for which the classical reference frame, i.e. rotor flux, is used, DFO involves the use of sensors, e.g. Hall sensors or flux coils, to measure air gap flux from which the rotor flux position can be determined. On the other hand, for this example, IFO entails the measurement of rotor position, e.g. using a shaft encoder, and then a calculation of rotor flux angle utilizing the slip relation of the induction machine model Disadvantageously, the classical DFO and IFO methods are sensitive to machine parameters. In fact, control parameters may depart unpredictably from real machine parameters due to various effects, such as temperature changes, rotor deep bar effects, drifting and saturation. The result is incorrect field-orientation, or detuning, which leads to performance degradation as decoupling of torque and flux becomes incomplete.

A further disadvantage of field-oriented controllers as heretofore known is a lack of flexibility. In particular, prior art field-oriented controllers generally have a fixed control strategy which determines controller hardware and software As such, each controller is either a DFO or an IFO controller operating in a fixed rotor flux, stator flux or air gap flux reference frame. Under different operating conditions, however, it is desirable to employ different control strategies. Unfortunately, prior to the present invention, additional hardware and software were necessary to transition to an alternative control strategy The field-oriented controller of the present invention is described by R. W. De-Doncker and D. W. Novotny in "The Universal Field Oriented Controller", Conference Record, IEEE-IAS, October 1988, pp. 450–456, which is hereby incorporated by reference.

OBJECTS OF THE INVENTION

Accordingly, it is an object of the present invention to provide a field-oriented controller capable of operating in an arbitrary reference frame.

Another object of the present invention is to provide a robust induction machine drive system, including a field-oriented controller, capable of operating in an arbitrary reference frame, which is relatively insensitive to machine parameters.

Another object of the present invention is to provide a field-oriented controller capable of operating in, and making transitions between, different arbitrary reference frames.

Yet another object of the present invention is to provide a field-oriented controller which enables both direct and indirect field-orientation without requiring additional hardware or software Still another object of the present invention is to provide a field-oriented controller operable in both DFO and IFO modes and in arbitrary reference frames.

SUMMARY OF THE INVENTION

The foregoing and other objects of the present invention are attained in a universal field-oriented controller for an induction machine which achieves full decoupling of torque and flux. The universal field-oriented controller (UFO) is capable of operating in, and making transitions between, arbitrary flux reference frames Furthermore, the UFO is capable of operating in a direct field-orientation (DFO) mode and an indirect field-orientation (IFO) mode without additional hardware or software.

In operating the induction machine controller of the invention, a synchronous reference frame is selected by setting the effective stator-to-rotor turns ratio to a predetermined value corresponding thereto. Reference frames of interest include rotor flux, air gap flux and stator flux. Transitions between reference frames are accomplished by changing the turns ratio No other machine parameters are affected. The result is complete decoupling of torque and flux in a flexible, simple and robust drive that is relatively insensitive to machine parameters.

BRIEF DESCRIPTION OF THE DRAWINGS

The features and advantages of the present invention will become apparent from the following detailed description of the invention when read with the accompanying drawings in which:

FIG. 2 is a schematic illustration of the flux linkages equivalent circuit with an arbitrary turns ratio a;

FIG. 3 illustrates the arbitrary flux vector $\Psi_a$ under steady state conditions for different values of the turns ratio a;

DETAILED DESCRIPTION OF THE INVENTION

Figure 1:
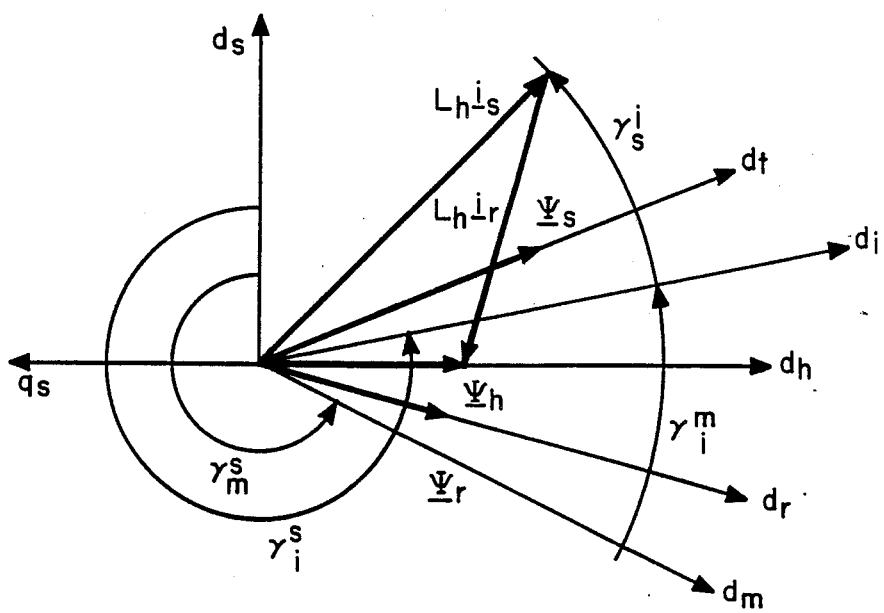
FIG. 1 is a vector diagram defining angles $\gamma_m^s$, $\gamma_i^s$, $\gamma_i^m$ and $\gamma_s^i$.

The induction machine equations expressed in an arbitrary synchronous reference frame i linked to an arbitrary flux vector are as follows:

$$v_s^i = R_s i_s^i + \frac{d\Psi_s^i}{dt} + j \frac{d\gamma_i^s}{dt} \Psi_s^i \qquad (1)$$

$$0 = R_r i_r^i + \frac{d\Psi_r^i}{dt} + j \frac{d\gamma_i^m}{dt} \Psi_r^i \qquad (2)$$

$$\Psi_s^i = L_s i_s^i + L_h i_r^i = L_{sl} i_s^i + \Psi_h^i \qquad (3)$$

$$\Psi_r^i = L_h i_s^i + L_r i_r^i = L_{rl} i_r^i + \Psi_h^i \qquad (4)$$

$$T_{em} = \frac{3}{2} p \, Im(i_s^i \cdot \Psi_s^{i*}) \qquad (5)$$

$$J \frac{d^2 \gamma_m^s}{dt^2} = T_{em} - T_{load} \qquad (6)$$

$$\gamma_m^s + \gamma_i^m = \gamma_i^s \qquad (7)$$

with:

$$L_s = L_h + L_{sl}$$

$$L_r = L_h + L_{rl}$$

where
$v_s^i$ = instantaneous stator voltage
$R_s$ = stator resistance
$R_r$ = rotor resistance
$L_h$ = main inductance $L_{al}$ = stator leakage inductance
$L_{rl}$ = rotor leakage inductance
$L_s$ = stator inductance
$L_r$ = rotor inductance
$T_{em}$ = electromagnetic torque
p = pole pair number
$T_{load}$ = load torque
J = system inertia
$\gamma_m^s$ = angular position of rotor shaft with respect to a fixed stator reference frame
$\gamma_i^s$ = angle from a fixed stator reference to arbitrary reference frame i
$\gamma_i^m$ = angle from the rotor shaft to arbitrary reference frame i;

and the system variables, including flux linkage $\Psi$ and current i, are written according to the following convention:

$$x_j^i = x_{jd}^i + j x_{jq}^i = x_{jd}^i + \sqrt{-1} \, x_{jq}^i$$

with:

j=r : rotor quantities
j=s : stator quantities
j=h : air gap quantities
j=m : mechanical rotor quantity (position)
i=r : rotor flux synchronous reference frame
i=s : stationary reference frame linked to phase a of the stator windings
i=t : stator flux synchronous reference frame
i=h : air gap flux reference frame
i=m : rotating reference frame linked to the rotor shaft
i=i : arbitrary synchronous reference frame
i=a : synchronous reference frame linked to arbitrary flux vector.

The angles $\gamma_m^s$, $\gamma_i^s$, $\gamma_i^m$ and $\gamma_s^i$ are defined in FIG. 1 and are in electrical degrees.

In accordance with the present invention, the arbitrary reference frame i is linked to an arbitrary flux vector $\Psi_a$ which can be derived from flux linkage equations (3) and (4) above by means of a stator-to-rotor effective turns ratio (a) transformation. Hence, it is not necessary to select one of the standard flux vectors $\Psi_r$, $\Psi_h$, or $\Psi_s$.

An arbitrary turns ratio a is introduced first by multiplying the rotor flux vector $\Psi_r$ by a constant a and by defining a transformed rotor current vector (designated herein by superscript '). From equation (4):

$$\Psi_r^{i'} = a\Psi_r^i = aL_h i_s^i + aL_r i_r^i - L_h i_r + L_h i_r. \qquad (8)$$

Equation (3) is rewritten as follows:

$$\Psi_s^i = L_s i_s^i + L_h i_r^i - aL_h i_s^i + aL_h i_s^i \qquad (9)$$

The transformed rotor current $i_r^{i'}$ is expressed as:

$$i_r^{i'} = \frac{i_r^i}{a} \qquad (10)$$

Equations (8) and (9) reduce to $$\Psi_s^i = (L_s - aL_h)i_s^i + aL_h(i_s^i + i_r^{i'}) = (L_s - aL_h)i_s^i + \Psi_a^i \qquad (11)$$

$$\Psi_r^{i'} = a(aL_r - L_h)i_r^{i'} + aL_h(i_s^i + i_r^{i'}) = \Psi_a^i + a(aL_r - L_h)i_r^{i'} \quad (12)$$

Figure 2:
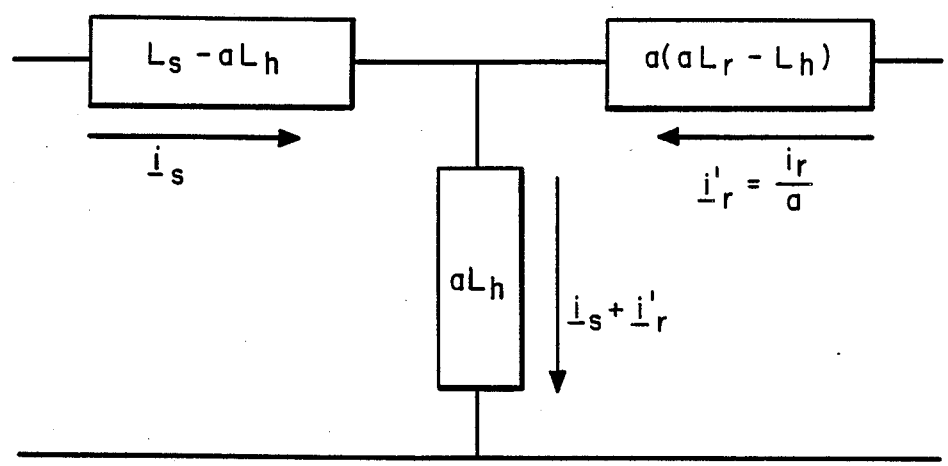

These flux linkages are represented by the electrical equivalent circuit of FIG. 2.

Using transformed rotor quantities, equation (2) is expressed as follows:

$$0 = R_i' i_r^{i'} + \frac{d\Psi_r^{i'}}{dt} + j\frac{d\gamma_i^m}{dt}\Psi_r^{i'} \quad (13)$$

where $R_r' = a^2 R_r$.

In order to express the induction machine equations in an arbitrary reference frame which is linked to the arbitrary flux vector $\Psi_a$, the q component of the reference flux vector is set to zero as follows:

$$\Psi_{aq}^i = \Psi_{aq}^a = 0.$$

The d axis of the reference frame is thus linked to the reference flux vector.

Figure 3:
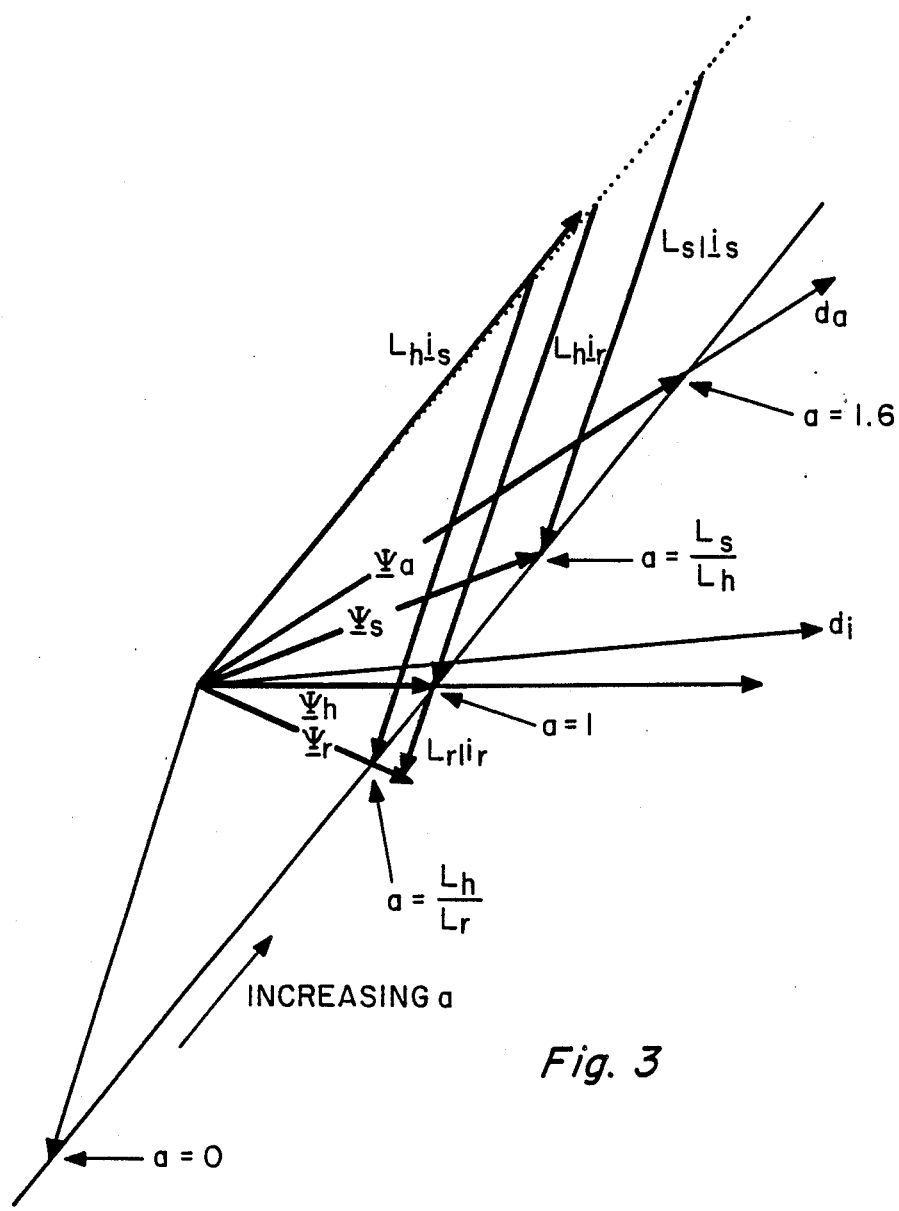

FIG. 3 illustrates the arbitrary flux vector $\Psi_a$ under steady state conditions for different values of the turns ratio a. As is evident from FIG. 3, as will be appreciated by those of skill in the art, the arbitrary flux vector $\Psi_a$ moves along a straight line and can assume any orientation between the stator and rotor current vectors In order to derive a decoupling circuit according to the present invention, first the rotor fluxes and currents are expressed as functions of the dq components of stator current in the arbitrary reference frame $\Psi_a$, i.e. $i_{sd}^a$ and $i_{sq}^a$, and the d component of the arbitrary flux vector $\Psi_{ad}^a$:

$$\Psi_{rd}^{a'} = \frac{aL_r}{L_h}\Psi_{ad}^a - \sigma_a a^2 L_r i_{sd}^a \quad (14)$$

$$\Psi_{rq}^{a'} = -\sigma_a a^2 L_r i_{sq}^a (\Psi_{aq}^a = 0) \quad (15)$$

$$i_{rd}^{a'} = \frac{\Psi_{ad}^a}{aL_h} - i_{sd}^a \quad (16)$$

$$i_{rq}^{a'} = -i_{sq}^a (\Psi_{aq}^a = 0) \quad (17)$$

where $$\sigma_a = \frac{aL_r - L_h}{aL_r}.$$

Next, equations (14)–(17) are substituted into equation (13), and equations for rotor slip frequency $\omega$ and the d component of the stator current are as follows:

$$\omega_a^m = \omega_i^m = \frac{d\gamma_i^m}{dt} = \frac{i_{sq}^a + \sigma_a \frac{L_r}{R_r} \frac{di_{sq}^a}{dt}}{\frac{1}{aL_h}\frac{L_r}{R_r}\Psi_{ad}^a - \sigma_a \frac{L_r}{R_r} i_{sd}^a} \quad (18)$$

$$\left(1 + \sigma_a \frac{L_r}{R_r}\frac{d}{dt}\right)i_{sd}^a = \quad (19)$$

$$\frac{1}{aL_h}\left(1 + \frac{L_r}{R_r}\frac{d}{dt}\right)\Psi_{ad}^a + \omega_a^m \sigma_a \frac{L_r}{R_r} i_{sq}^a$$

The torque expression of the induction machine becomes $$T_{em} = \frac{3}{2} p\, i_{sq}^a \Psi_{ad}^a \quad (20)$$

Figure 4:
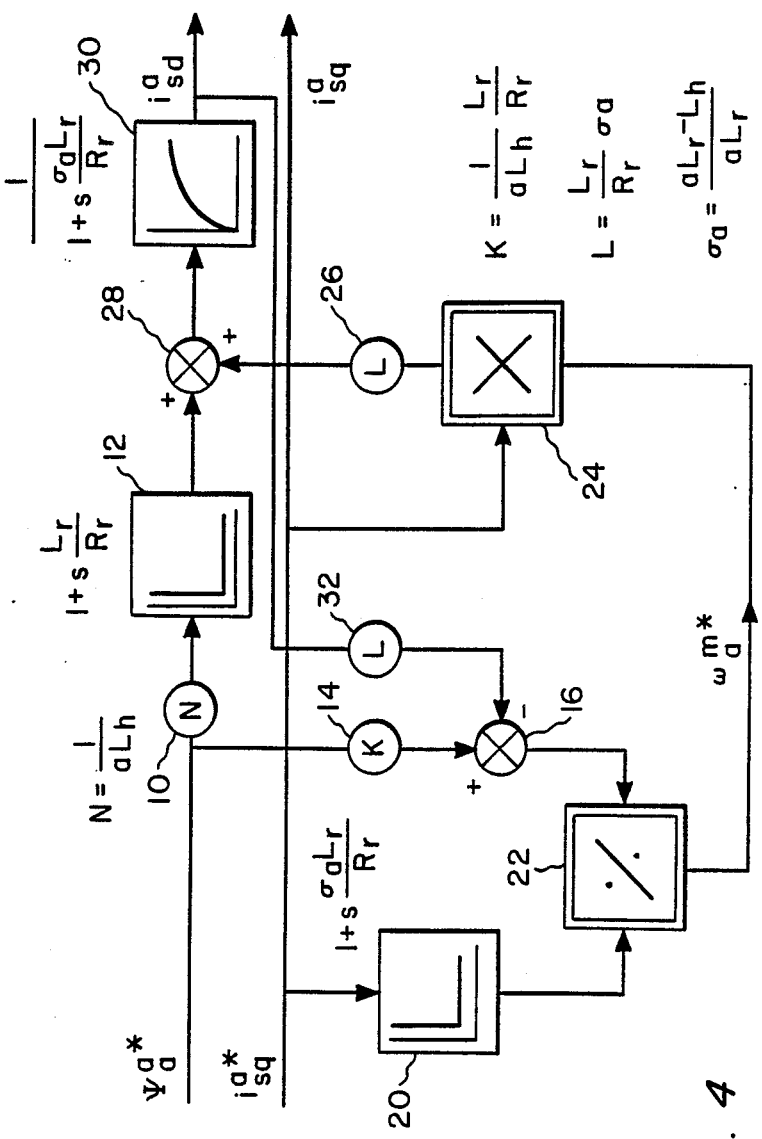
FIG. 4 schematically illustrates a decoupling network for the universal field-oriented controller of the present invention in an arbitrary reference frame linked to an arbitrary flux vector.

In accordance with the present invention, equations (18) and (19) describe the decoupling network for a field-oriented controller in an arbitrary reference frame linked to arbitrary flux vector $\Psi_a$. FIG. 4 illustrates such a decoupling network for which the torque component of stator current, $i_{sq}^a$, and the d component of the arbitrary flux vector, $\Psi_{ad}^a$, are input commands, i.e. represented by using superscript *. By the illustrated decoupling circuit, the flux component of the stator current command, $i_{sd}^{a*}$, is calculated dynamically for all states of the induction machines in such a way that the torque $T_{em}$ is independently controllable, i.e., proportional to $i_{sq}^{a*}$ at a fixed flux command $\Psi_{ad}^{a*}$. This method is in contrast to classical field-orientation methods wherein the dq components of stator current, $i_{sq}^a$ and $i_{sd}^a$, are employed as input commands, and the rotor flux vector is calculated therefrom. As a result, such classical methods are capable of complete decoupling only in the rotor flux reference.

As shown in FIG. 4, flux command $\Psi_a^{a*}$ is multiplied in a multiplier 10 by the quantity $$N = \frac{1}{aL_h},$$

and the resulting signal is applied to a circuit 12 having the transfer function $$1 + s\frac{L_r}{R_r}.$$

Flux command $\Psi_a^{a*}$ is also applied, via an alternate path, to a multiplier 14 wherein it is multiplied by the quantity $$K = \frac{1}{aL_n}\frac{L_r}{R_r}.$$

The resulting signal $K\Psi_a^{a*}$ is compared in a summer 16 to the signal $Li_{sd}^a$, where $$L = \frac{L_r}{R_r}\sigma_a.$$

Stator current command $i_{sq}^{a*}$ is supplied to a circuit 20 having the transfer function $$1 + s\frac{\sigma_r L_r}{R_r},$$

and the resulting signal is divided in a divider 22 by the output signal of summer 16 to produce a rotor slip frequency command $\omega_a^{m*}$ as expressed in equation (18). Stator current command $i_{sq}^{a*}$ is also applied to a multiplier 24 by rotor slip frequency command $\omega_a^{m*}$ to produce a signal which is multiplied in a multiplier 26 by a quantity $$L = \frac{L_r}{R_r} \sigma_a.$$

The output signal of multiplier 26 is added in a summer 28 to the aforementioned output signal of circuit 12. The sum is provided to a circuit 30 having the transfer function $$\frac{1}{1 + s\frac{\sigma_a L_r}{R_r}}$$

produce the flux component of the stator current, $i_{sd}{}^a$. Stator current component $i_{sd}{}^a$ is fed back to a multiplier 32 having the hereinabove mentioned multiplicative factor L. The loop comprising elements numbered 32, 16, 22, 24, 26, 28 and 30 is inherently a positive feedback loop which is stable for values of torque less than the pull-out, or breakdown, torque, i.e., the value of torque after which torque decreases with increasing current.

With the torque and flux decoupling network derived, a field-oriented controlled may be completed by providing means for generating command signals in a stationary stator reference frame for operating an inverter for driving an induction machine. In particular, for a current-source (CS) inverter, these command signals comprise a stator current magnitude command $i_s{}^*$ and a stator current position command $\gamma_s{}^{s*}$. It is to be understood that the principles of the UFO controller of the present invention apply equally to pulse width modulation (PWM) inverters. The command signals for PWM inverters are phase current command signals which are generated from the dq components of stator current using a vector rotator and a two-phase to three-phase transformation (i.e. for a three-phase machine) according to methods well-known in the art. For purposes of illustration, however, the UFO controller is described with reference to a CS inverter.

There are two methods for generating the inverter command signals. The first is a method of indirect field orientation (IFO) whereby the stator current position angle $\gamma_s{}^s$ is calculated by adding the reference axis position angle $\gamma_a{}^m$, to the position angle of the rotor shaft, $\gamma_m{}^s$, and the angle $\gamma_s{}^a$ according to the expression:

$$\gamma_s{}^s = (\gamma_a{}^m + \gamma_m{}^s) + \gamma_s{}^a = \gamma_a{}^s + \gamma_s{}^a \quad (21)$$

Figure 5:
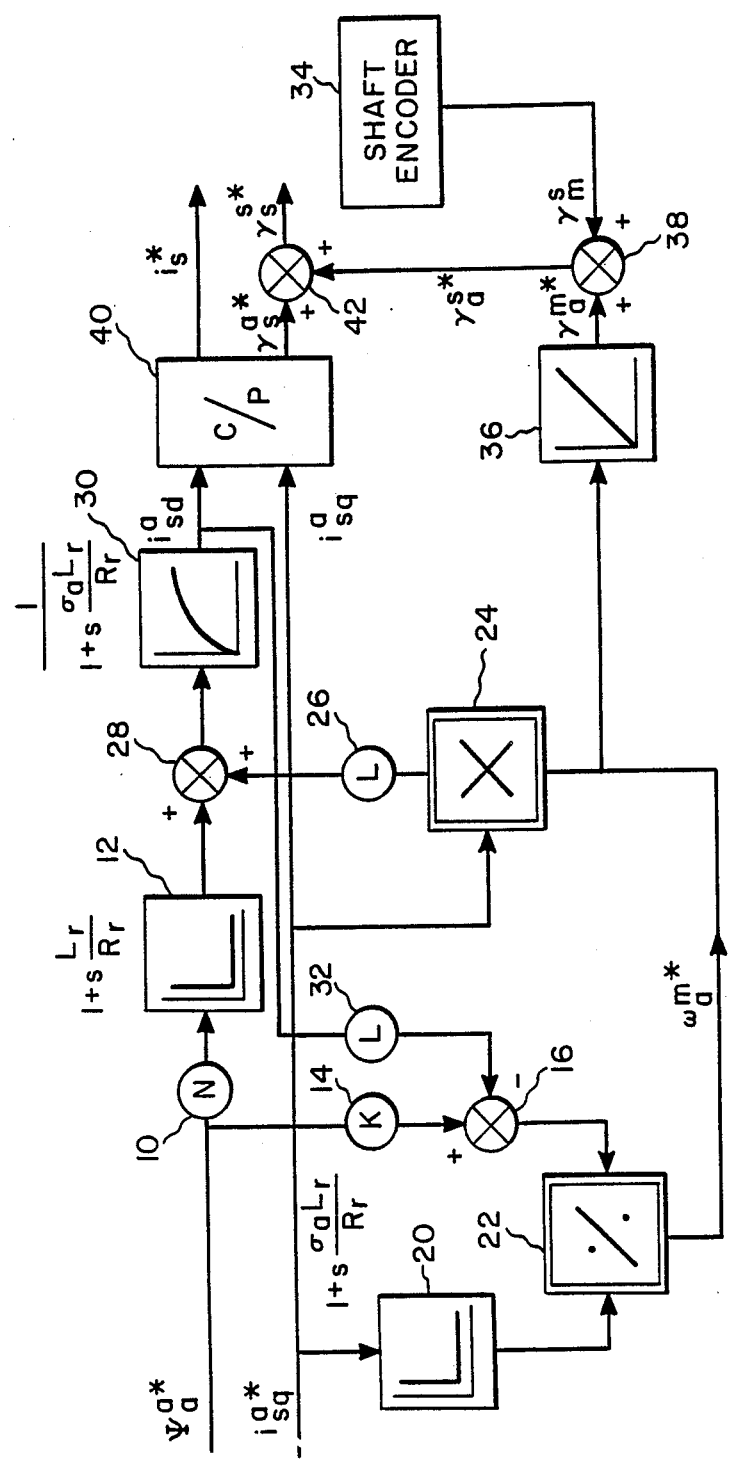
FIG. 5 schematically illustrates the UFO controller of the present invention operating in the IFO mode.

FIG. 5 illustrates the IFO controller according to one embodiment of the present invention. As shown, a rotor shaft encoder 34 is used to measure rotor position $\gamma_m{}^s$. In addition, IFO control requires a calculation of a rotor slip angle command from the rotor slip frequency command $\omega_a{}^{m*}$. This is accomplished by integrating the rotor slip frequency command $\omega_a{}^{m*}$ in an integrator 36. The rotor slip angle command $\gamma_a{}^{m*}$ is added in a summer 38 to the rotor position signal $\gamma_m{}^s$ to produce a signal representative of angle $\gamma_a{}^{s*}$.

As shown in FIG. 5, the IFO controller also includes means for making a Cartesian-to-polar coordinate transformation, these coordinate transformation means being represented by a function block 40. The direct and quadrature components of stator current in the arbitrary reference frame are input signals to a function block 40; and angle command $\gamma_s{}^{a*}$ and stator current magnitude command $i_s{}^*$ are the output signals therefrom. Angle command $\gamma_s{}^{a*}$ is added in a summer 42 to the hereinabove mentioned angle command $\gamma_a{}^{s*}$ to generate the stator current angle command $\gamma_s{}^{s*}$.

Figure 6:
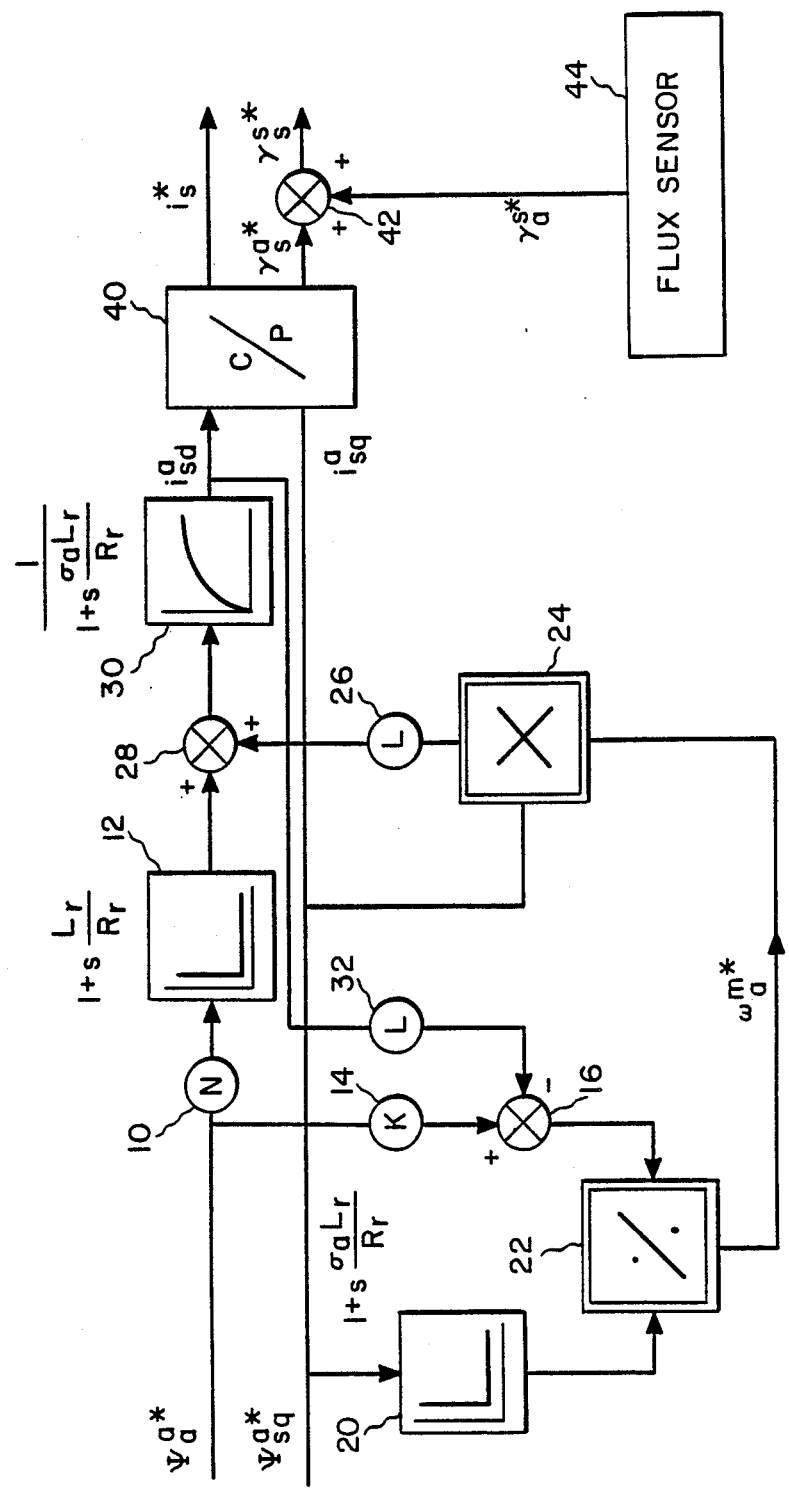
FIG. 6 schematically illustrates the UFO controller of the present invention operating in the DFO mode.

The second method for deriving the stator current commands involves direct field-oriented control (DFO). As illustrated in FIG. 6, DFO involves using flux sensors 44, such as Hall effect sensors or flux coils, to measure flux position angle $\gamma_a{}^{s*}$ directly. Alternatively, measurements of stator voltages and currents can be used to calculate the flux position angle for DFO.

In accordance with the present invention, the IFO controller of FIG. 5 and the DFO controller of FIG. 6 can be realized with the same hardware and software, i.e. digital processing scheme, to provide a universal field-oriented controller (UFO). That is, the UFO implements IFO and DFO in an arbitrary reference frame. As a result, any flux vector can be controlled while maintaining proper control of the electromagnetic torque of the machine.

A particular flux vector is selected by setting the value of the turns ratio a. All other machine parameters remain unaffected. Table I hereinbelow gives three specific synchronous reference frames and corresponding values of the turns ratio a.

TABLE 1

| Flux Reference Frame | Flux Vector $\Psi_a$ | Turns Ratio a |
|---|---|---|
| Rotor | $\Psi_r{}'$ | $\frac{L_h}{L_r}$ |
| Air gap | $\Psi_h$ | 1 |
| Stator | $\Psi_s$ | $\frac{L_s}{L_h}$ |

Figure 7:
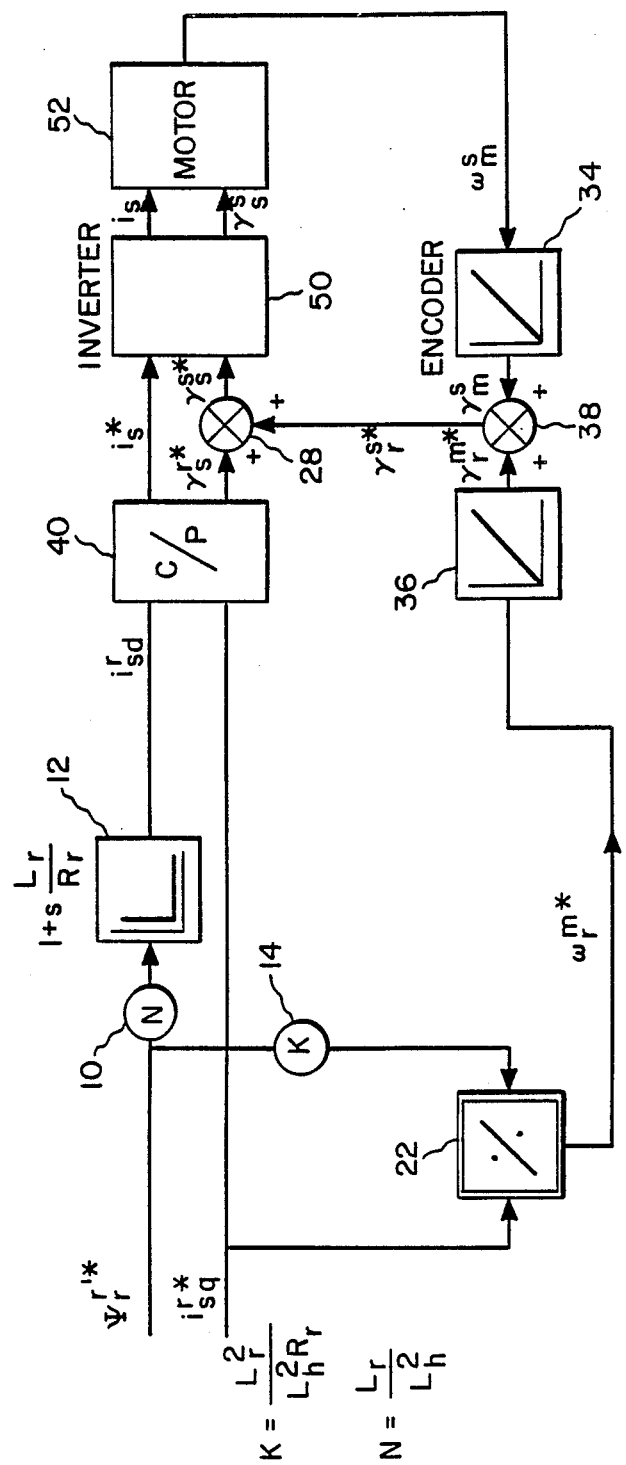
FIGS. 7–9, respectively, are schematic illustrations of the UFO controller employing IFO in the rotor flux, air gap flux and stator flux reference frames, respectively.
Figure 8:
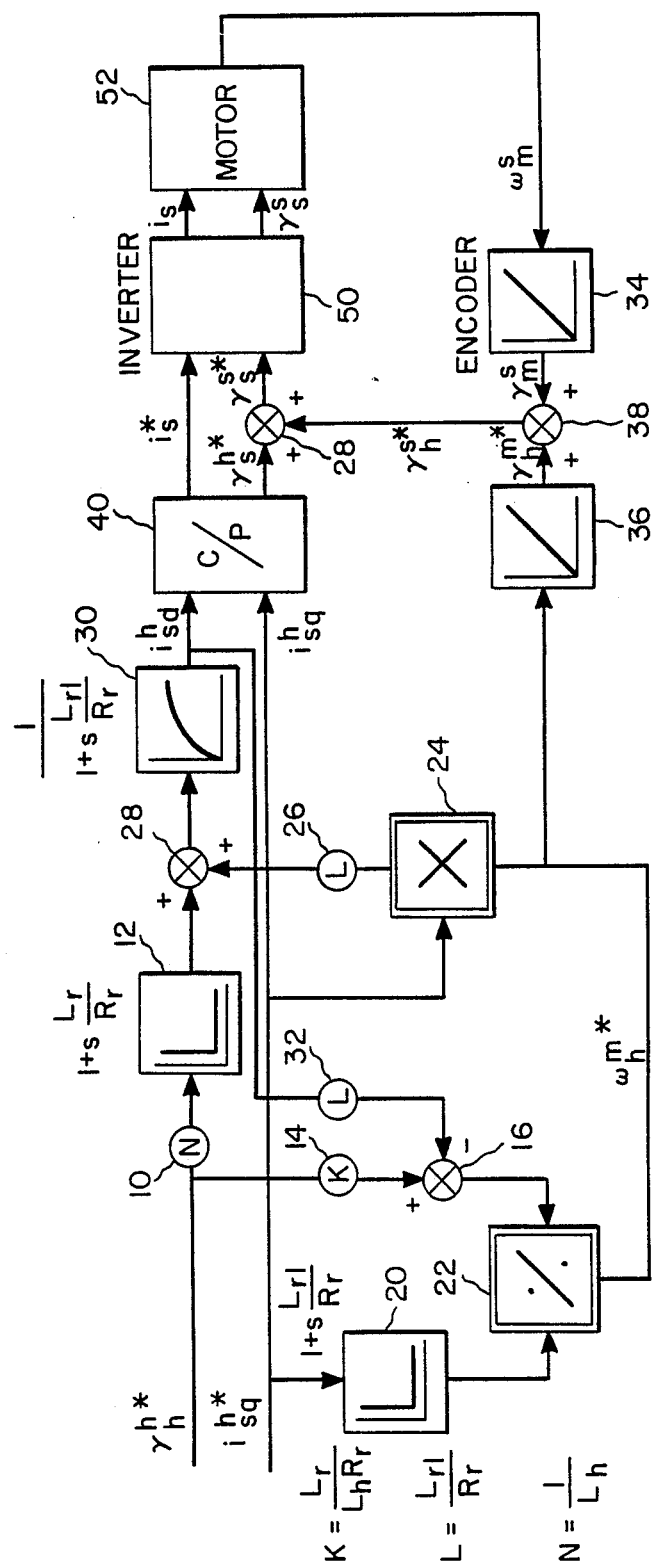
Figure 9:
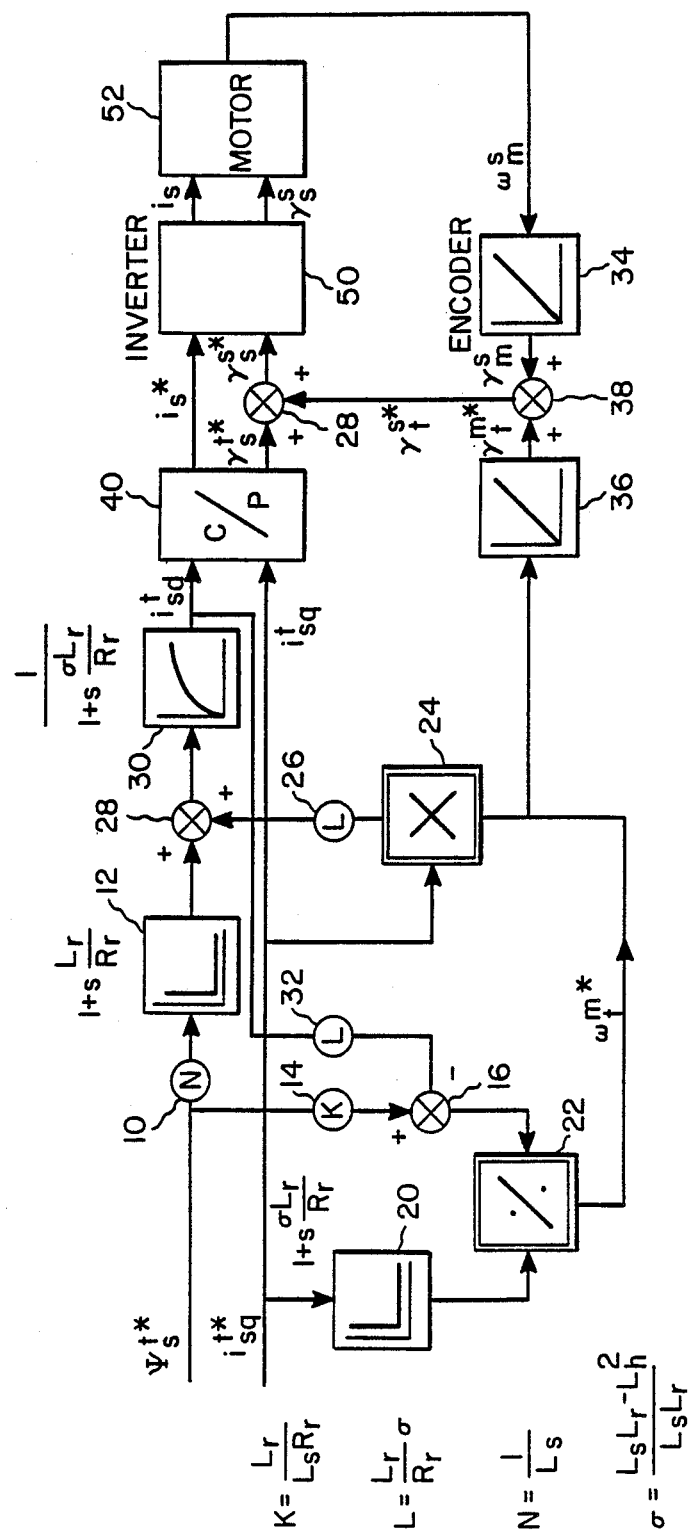

FIGS. 7, 8 and 9 respectively illustrate the UFO controller employing indirect field orientation in the rotor flux, air gap flux and stator flux reference frames for an induction motor drive system including an inverter 50 and an induction motor 52. Notably, the UFO controller of FIG. 7 assumes the construction of the well-known IFO scheme in the classical rotor flux reference frame, since the rotor current vector and the rotor flux vector of an induction machine are orthogonal to each other. In general, however, any other choice of reference frame requires the positive feedback calculation loop described hereinabove to obtain complete decoupling of torque and flux.

Figure 10:
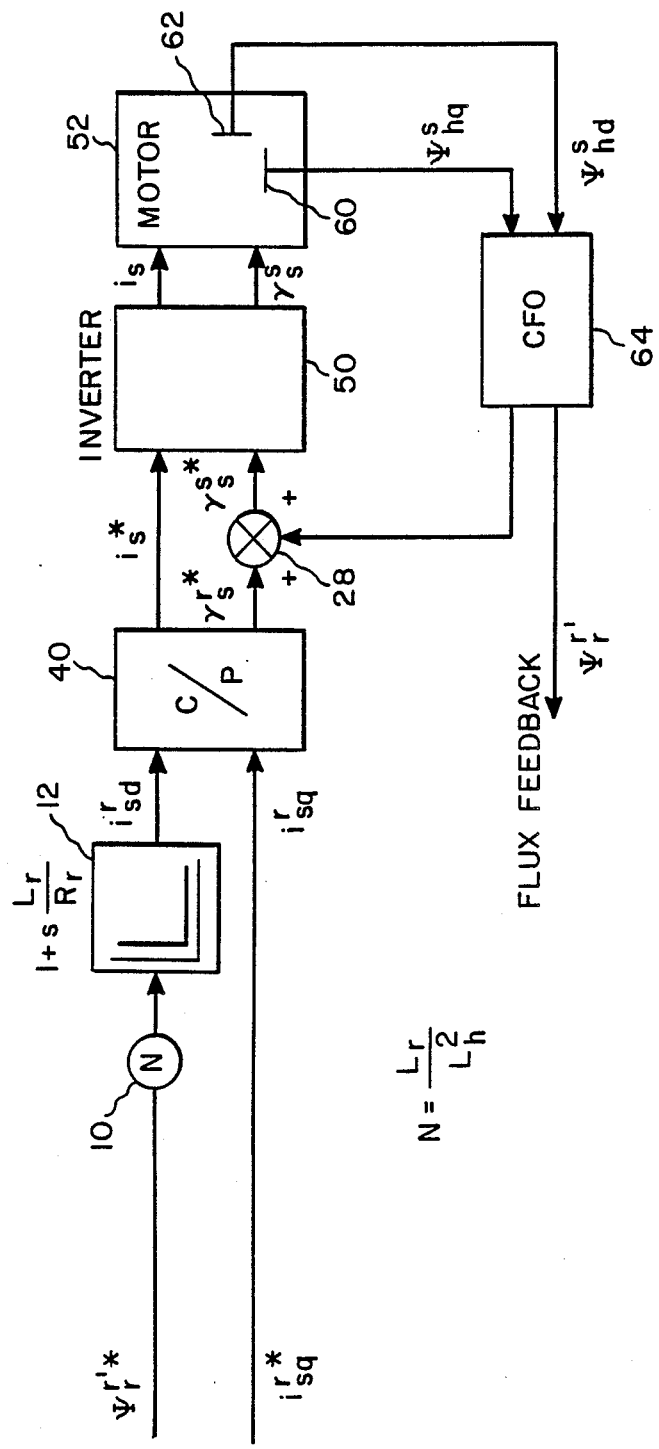
FIGS. 10–12, respectively, are schematic illustrations of the UFO controller employing DFO in the rotor flux, air gap flux and stator flux reference frames, respectively.
Figure 11:
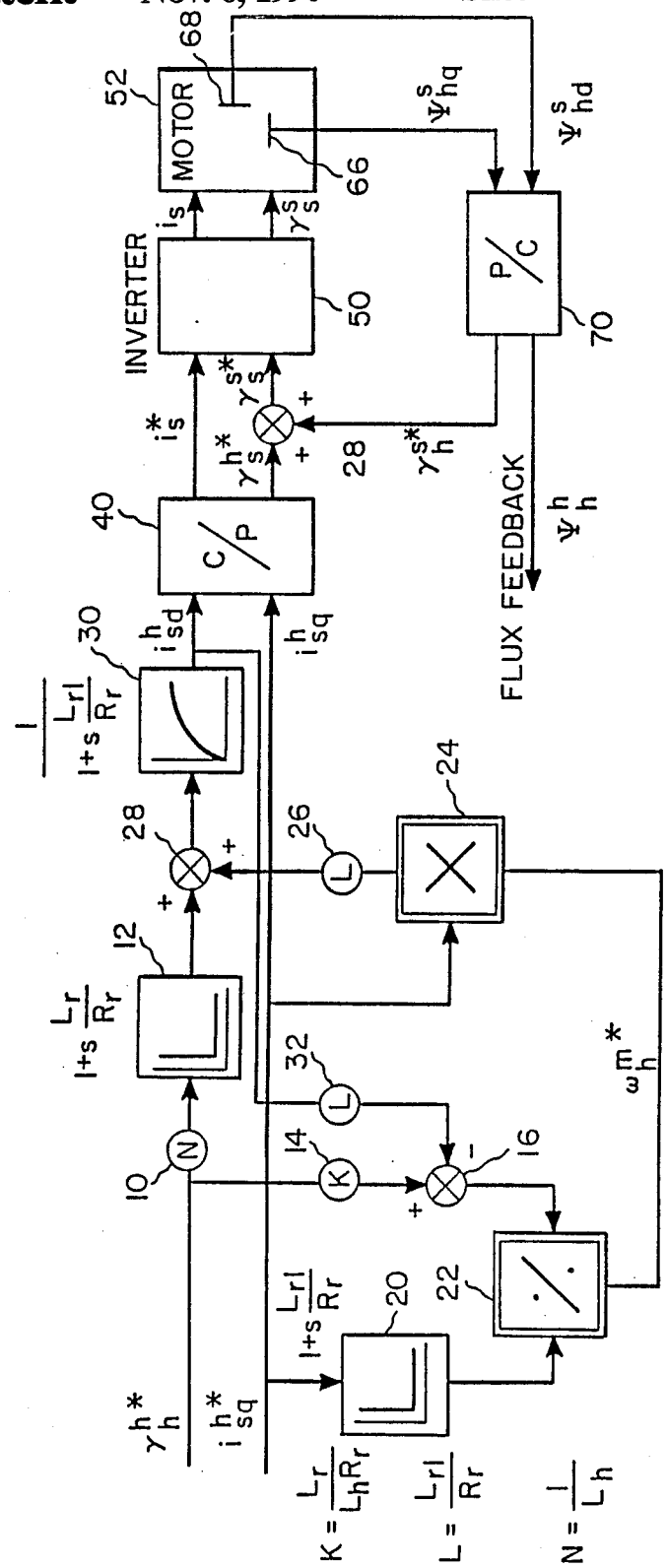
Figure 12:
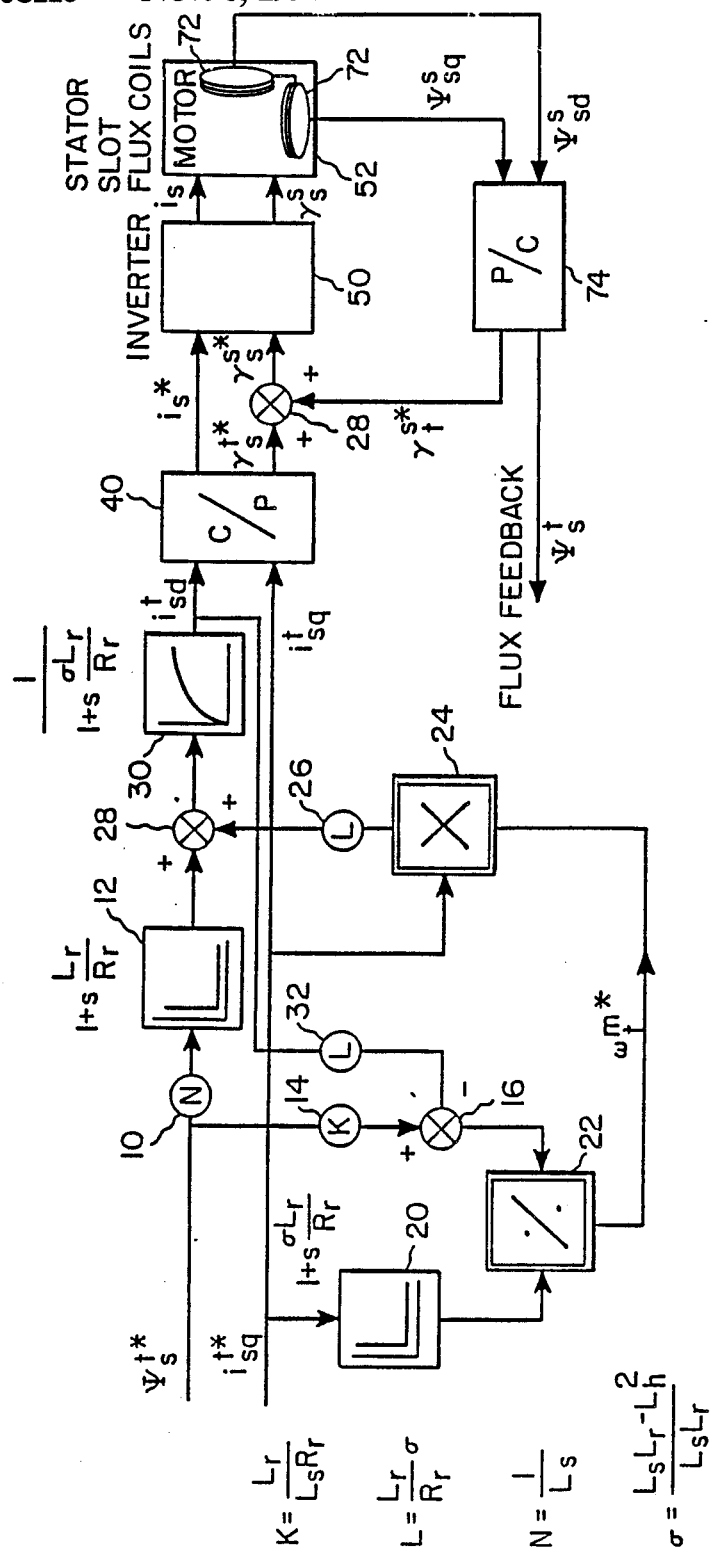

FIGS. 10, 11 and 12 respectively illustrate the UFO controller employing direct field orientation in the rotor flux, air gap flux and stator flux reference frames, respectively. In particular, FIG. 10 shows a DFO scheme in a rotor flux reference frame wherein Hall sensors 60 and 62 are used to measure air gap flux, and a calculator for field orientation (CFO) 64 is used to calculate rotor flux position. A CFO, such as CFO 64, determines rotor flux position by a two-step process, as described in "Dynamics of Vector Control and Field Orientation" by D. W. Novotny and T. A. Lipo, found in chapter 5 of Field Orientation and High Performance Motion Control, University of Madison—Wisconsin, 1989, p. 59, which is hereby incorporated by reference. First, air gap flux components are calculated from sensor signal measurements; second, magnitude, $\Psi_r{}'$, and angle, $\gamma_r{}^{s*}$, of the rotor flux vector are determined using flux linkage equation (4).

FIG. 11 shows a DFO scheme wherein Hall sensors 66 and 68 are employed in the air gap to measure the dq components of the flux vector, i.e. $\Psi_{hq}{}^s$ and $\Psi_{hd}{}^s$. A Cartesian-to-polar coordinate transformation is made in by a circuit 70, and the output signals $\Psi_h{}^h$ and $\gamma_h{}^{s*}$ are representative of magnitude and position of the air gap flux vector, respectively. Advantageously, as evident in FIG. 11, these signals do not depend on machine parameters for the calculation thereof.

FIG. 12 shows a DFO scheme in a stator flux reference frame wherein dq components of stator flux are sensed using stator slot flux coils 72. A Cartesian to polar coordinate transformation is made in circuit 74 to produce signals $\Psi_s{}^t$ and $\Psi_s{}^{s*}$ representative of magnitude and position of the stator flux vector, respectively. Advantageously, as evident in FIG. 12, these signals do not depend on machine parameters for the calculation thereof.

Figure 13:
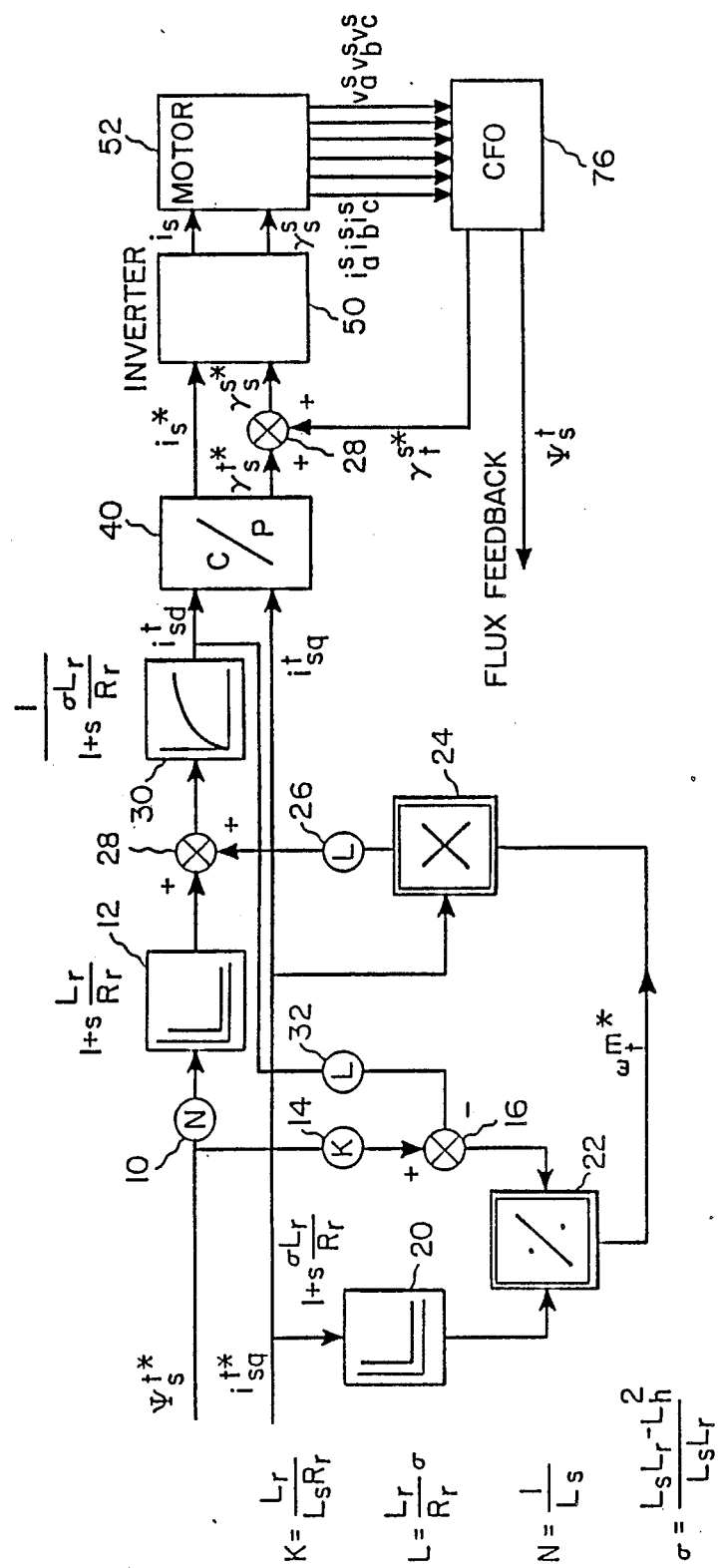
FIG. 13 is a schematic illustration of the UFO controller employing DFO in the stator flux reference frame, using stator voltages and currents with a stator flux position calculator.

In order to avoid the use of flux sensors in a DFO scheme, flux position may be calculated from the machine stator voltages and currents. FIG. 13 illustrates such a scheme in the stator flux reference frame. As illustrated for a three-phase machine, stator currents $i_a{}^s$, $i_b{}^s$ and $i_c{}^s$ and stator voltages $v_a{}^s$, $v_b{}^s$ and $v_c{}^s$ are measured using suitable sensors (not shown), and a CFO 76 calculates stator flux position therefrom. The DFO is only parameter-dependent on stator resistance.

The UFO controller of the present invention is capable of changing the reference frame during operation of the drive. As hereinabove stated, no change of hardware is required. As a result, drives operating over a wide speed range can utilize different control strategies. For example, at low speeds, the UFO controller may be set to operate in the IFO mode with rotor or air gap control. At high speeds, i.e. in the flux weakening area, the UFO may be set to operate in the DFO mode with stator flux control.

A change in reference flux vector requires a change in the commanded value of flux. Otherwise, a step change in flux will occur when switching to a different turns ratio a, resulting in high current transients. Such transients can be prevented by calculating the input commands for the control strategies not being employed. To this end, the input commands for the UFO controller operating in the three aforesaid reference frames are as follows:

For the rotor flux reference frame:

$$\Psi_{rd}^{a'} = \frac{aL_r}{L_h}\Psi_{ad}^a - \sigma_a a^2 L_r i_{sd}^a \quad (22)$$

$$\Psi_{rq}^{a'} = -\sigma_a a^2 L_r i_{sq}^a \quad (23)$$

$$\Psi_r^a = \sqrt{\Psi_{rd}^{a2} + \Psi_{rq}^{a2}} \quad (24)$$

For the air gap flux reference frame:

$$\Psi_{hd}^q = \Psi_{ad}^a + (1-a)L_h i_{sd}^a \quad (25)$$

$$\Psi_{hq}^q = (1-a)L_h i_{sq}^a \quad (26)$$

$$\Psi_h^a = \sqrt{\Psi_{hd}^{q2} + \Psi_{hq}^{q2}} \quad (27)$$

For the stator flux reference frame:

$$\Psi_{sd}^a = \Psi_{ad}^a + (L_s - aL_h)i_{sd}^a \quad (28)$$

-continued $$\Psi_{sq}^a = (L_s - aL_h)i_{sq}^a \quad (29)$$

$$\Psi_s^a = \sqrt{\Psi_{sd}^{a2} + \Psi_{sq}^{a2}} \quad (30)$$

Since the turns ratio a is already set to one of the values hereinabove listed in Table 1, only two sets of the hereinabove listed equations (22)-(24), (25)-(27) and (28)-(30) must be calculated at a time. However, all three routines have to be provided in order to switch from one reference frame to another.

A preferred implementation of the UFO controller with dynamically selective flux reference vectors of the present invention is in a single TMS32010 digital signal processor manufactured by Texas Instruments.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A field-oriented controller for an induction machine, comprising:

first command means for receiving a flux command in an arbitrary synchronous reference frame linked to an arbitrary flux vector, said flux command representing the magnitude of said arbitrary flux vector;

second command means for receiving a quadrature stator current command in said arbitrary reference frame;

third command means responsive to said first and second command means for generating a rotor slip frequency command;

decoupling means responsive to said first, second and third command means for calculating the direct component of stator current in said arbitrary reference frame so that electromagnetic torque developed by said induction machine is proportional to said quadrature stator current command at each respective value of said flux command, the electromagnetic torque being decoupled from said flux command;

arbitrary flux position angle measuring means for determining the angle of said arbitrary flux vector relative to rotor position;

coordinate transformation means responsive to said arbitrary flux position angle measuring means for transforming the direct component of stator current and said quadrature stator current command to stator current drive commands in a stationary stator reference frame; and an inverter responsive to said stator current drive commands for supplying AC power to said induction machine.

2. The field-oriented controller of claim 1 wherein said arbitrary flux angle measuring means comprises:

rotor position sensing means for producing a signal representative of rotor position; and means responsive to said rotor position signal and said rotor slip frequency command for calculating said angle of said arbitrary flux vector relative to rotor position.

3. The field-oriented controller of claim 1 wherein said arbitrary flux position angle measuring means comprises rotor flux sensing means.

4. The field-oriented controller of claim 3 wherein said arbitrary flux sensing means comprises flux coils.

5. The field-oriented controller of claim 3 wherein said arbitrary flux sensing means comprises Hall effect sensors.

6. The field-oriented controller of claim 1 wherein said arbitrary flux position angle measuring means comprises:
   current sensing means for sensing the stator current in each respective phase and generating stator current signals representative thereof;
   voltage sensing means for sensing the stator voltage for each respective phase and generating stator voltage signals representative thereof; and
   means responsive to said current sensing means and said voltage sensing means for calculating said arbitrary flux position angle from said stator current signals and said stator voltage signals.

7. The field-oriented controller of claim 1, further comprising reference frame selection means for specifying said arbitrary reference frame.

8. The field-oriented controller of claim 7 wherein said reference frame selection means comprises means for determining the stator-to-rotor turns ratio.

9. The field-oriented controller of claim 8 wherein the turns ratio is substantially equal to the ratio of air gap inductance to rotor inductance, said arbitrary reference frame being selected to be a rotor flux reference frame.

10. The field-oriented controller of claim 8 wherein the turns ratio is substantially equal to one, said arbitrary reference being selected to be an air gap flux reference frame.

11. The field-oriented controller of claim 8 wherein the turns ratio is substantially equal to the ratio of stator inductance to air gap inductance, said arbitrary reference frame being selected to be a stator flux reference frame.

12. The field-oriented controller of claim 1, further comprising means for making transitions from one said arbitrary reference frame to another said arbitrary reference frame.

13. The field-oriented controller of claim 1 wherein said arbitrarily reference frame is selected from the group consisting of a rotor flux reference frame, an air gap flux reference frame, and a stator flux reference frame.

14. The field-oriented controller of claim 1 wherein:
   said inverter comprises a current-source inverter; and
   said stator current drive commands comprise a stator current magnitude command and a stator current position command.

15. The field-oriented controller of claim 1 wherein said inverter comprises a pulse width modulation inverter.

16. A method for field-oriented controlling an induction machine, comprising:
   providing a flux command in an arbitrary synchronous reference frame linked to an arbitrary flux vector, said flux command representing the magnitude of said arbitrary flux vector;
   providing a quadrature stator current command in said arbitrary reference frame;
   generating a rotor slip frequency command from said flux command and said quadrature stator current command;
   calculating the direct component of stator current in said arbitrary reference frame so that electromagnetic torque developed by said induction machine is proportional to said quadrature stator current command at each respective value of said flux command, the electromagnetic torque being decoupled from said flux command;
   determining the angle of said arbitrary flux vector relative to rotor position;
   transforming the direct component of stator current and said quadrature stator current command to stator current drive commands in a stationary stator reference frame; and
   providing said stator current drive commands to an inverter for supplying AC power to said induction machine.

17. The method of claim 16 wherein the step of determining the angle of said arbitrary flux vector comprises:
   sensing rotor position and producing a signal representative thereof; and
   calculating the angle of said arbitrary flux vector from said signal representative of rotor position and said rotor slip frequency command.

18. The method of claim 15 wherein the step of determining said arbitrary flux vector relative to rotor position comprises flux sensing.

19. The method of claim 18 wherein the step of flux sensing comprises:
   sensing stator current in each respective phase and generating stator current signals representative thereof;
   sensing stator voltage for each respective phase and generating stator current signals representative thereof; and
   calculating said arbitrary flux position angle from said stator current signals and said stator voltage signals.

20. The method of claim 16, further comprising the step of specifying said arbitrary reference frame, said method of field-oriented control enabling transitions between said arbitrary reference frames.

21. The method of claim 20 wherein said step of specifying said arbitrary reference frame comprises specifying the stator-to-rotor turns ratio.

22. The method of claim 20 wherein said step of specifying said arbitrary reference frame comprises specifying the turns ratio to be substantially equal to the ratio of air gap inductance to rotor inductance, said arbitrary reference frame comprising a rotor flux reference frame.

23. The method of claim 20 wherein said step of specifying said arbitrary reference frame comprises specifying the turns ratio to be substantially equal to one, said arbitrary reference comprising an air gap flux reference frame.

24. The method of claim 20 wherein said step of specifying said arbitrary reference frame comprises specifying the turns ratio to be substantially equal to the ratio of stator inductance to air gap inductance, said arbitrary reference frame comprising a stator flux reference frame.

25. The method of claim 16 wherein said arbitrary reference frame is selected from the group consisting of a rotor flux reference frame, an air gap flux reference frame, and a stator flux reference frame.

* * * * *

UNITED STATES PATENT AND TRADEMARK OFFICE
CERTIFICATE OF CORRECTION

PATENT NO. : 4,968,925

DATED : November 6, 1990

INVENTOR(S) : WIVINA A. A. DE DONCKER

It is certified that error appears in the above-identified patent and that said Letters Patent is hereby corrected as shown below:

Title page, item (75):

Please correct the inventor's name from

"Wivina A. A. De Doncker" to

-- Rik W.A.A. De Doncker --.

Signed and Sealed this

First Day of September, 1992

Attest:

DOUGLAS B. COMER

Attesting Officer

Acting Commissioner of Patents and Trademarks